US006867813B2

(12) United States Patent
Dawson et al.

(10) Patent No.: US 6,867,813 B2
(45) Date of Patent: Mar. 15, 2005

(54) FLAT MOLDABLE HDTV DISPLAY

(75) Inventors: Thomas Patrick Dawson, Escondido, CA (US); David Bessel, Poway, CA (US); David Boyden, Escondido, CA (US); David Alan Desch, Poway, CA (US); Paul Georgief, San Diego, CA (US); Priyan Deveka Gunatilake, San Diego, CA (US); Kevin Jones, San Diego, CA (US); Takaaki Ota, San Diego, CA (US); Christopher Jensen Read, San Diego, CA (US); Kenichi Kawasaki, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 561 days.

(21) Appl. No.: 09/844,840

(22) Filed: Apr. 27, 2001

(65) Prior Publication Data

US 2003/0164902 A1 Sep. 4, 2003

(51) Int. Cl.$^7$ ............................ H04N 3/14; H04N 9/12; H04N 9/30
(52) U.S. Cl. ........................ 348/383; 348/791; 349/5; 353/31; 353/99
(58) Field of Search ........................ 348/383, 790–791; 349/5–9; 353/31, 99, 122; H04N 3/14, 9/12, 9/30

(56) References Cited

U.S. PATENT DOCUMENTS

| | | | | |
|---|---|---|---|---|
| 5,528,318 A | * | 6/1996 | Janssen | 348/756 |
| 5,532,763 A | * | 7/1996 | Janssen et al. | 348/744 |
| 5,852,512 A | * | 12/1998 | Chikazawa | 359/463 |
| 5,897,191 A | * | 4/1999 | Clarke | 353/31 |
| 6,104,446 A | * | 8/2000 | Blankenbecler et al. | 349/5 |
| 6,490,402 B1 | * | 12/2002 | Ota | 385/147 |
| 6,761,459 B1 | * | 7/2004 | Arsenich | 353/122 |

FOREIGN PATENT DOCUMENTS

EP 0775929 * 5/1997 ............. G02F/1/03

OTHER PUBLICATIONS

Progress in Proejction and Large–Area Displays, Charles W. McLaughlin, Proceedings of the IEEE, pp 521–532.*
"What are liquid crystals?", at web address http://blg.colorado.edu/lc.*
"What are Ferroelectric Liquid Crystals?" at web address http://blg.colorado.edu/lc/flc.html.*

* cited by examiner

Primary Examiner—Brian P. Yenke
(74) Attorney, Agent, or Firm—Blakely, Sokoloff, Taylor & Zafman LLP

(57) ABSTRACT

An apparatus comprising a plurality of columns bound together, configured to display a single row of pixels scanned out from top to bottom. It also comprises a timing control unit to synchronize between the columns to allow all pixels of a single row to be lit at the same time.

20 Claims, 5 Drawing Sheets

FLAT MOLDABLE HDTV DISPLAY

FIELD OF THE INVENTION

The invention relates to a moldable display that is capable of showing a high definition television image (HDTV).

BACKGROUND

Liquid crystal is a term that generally indicates the status of a substance that is neither solid nor liquid. Liquid crystal displays (LCDs) are categorized as non-emissive display devices, therefore they do not produce any form of light like a Cathode Ray Tube (CRT). LCDs either pass or block light that is reflected from an external light source or provided by a back/side lighting system.

FIG. 1 is a cross-section of a twisted nematic LCD panel in transmission mode. Liquid crystal material 5 is contained between two glass plates 10 and 15; each plate has microscopic grooves on its inner surface, with the grooves aligned at an angle to each other, typically 90°. The alignment of the plate grooves causes the molecule alignment of liquid crystal material 5 to spiral by 90° between the bottom and top of the panel. Light is projected through the panel, in this case, by backlight source 27. To obtain control of light transmission in the panel, two polarizers 20 and 25 are placed behind and above the panel, with their plane of polarization aligned with the grooves in the glass plates. As the light passes through liquid crystal material 5, its polarization is rotated as the molecule alignment twists, so that full light transmission occurs even though the polarizers are at 90° to each other.

An electric field is applied to a location on the panel by applying voltage to control electrodes 30 and 35. The electric field causes molecules 40 of liquid crystal material 5 to begin to align with the field and the 90° spiral is disrupted. The result is that as light transmission is reduced, the panel gets darker where the field is applied.

A flat panel display is formed of many pixels, e.g., 640 rows by 480 columns. Each pixel may be represented for monochromatic displays, as the panel illustrated in FIG. 1. For color applications, a pixel such as illustrated in FIG. 1 may be divided into sub-pixels such as Red, Green, and Blue sub-pixels with color filter material controlling the emitted light from each sub-pixel.

As shown in FIG. 2, current flat panel displays 45 are fabricated of semiconductor chip-like structures of thousands of devices, e.g., transistors, diodes, etc., formed on a single substrate. One problem is that each of the many panels of transistors and diodes have to meet a minimum performance standard and it is not always possible to determine if there is a defective element until the end of the process. Because of defective element 50 (e.g., defective pixels), production is lost and the whole batch must be discarded. Also, flat displays generally cannot be made very big and are difficult to produce.

A second type of display is a projection display requiring a projector. Front projection occurred if one was on the same side as the screen, whereas rear projection occurred if one was on one side of the screen and the projector was on another. One type of projector 55, as shown in FIG. 3, is the micro-mirror. Micro-mirror device 60 steers light in the desired spots as the color of light is changing, steering the light across sheet 65. One problem with micro-mirror devices is that there exists a significant gap between projector 55 and screen 65, particularly as the size of the screen increases. Reducing the gap between the projector and the screen creates distortion. Therefore, a balance must occur, that is, a balance to get close enough for a clear image but far enough to avoid any distortion, which can be difficult to accomplish.

The "picture on the wall" display has long been a goal of television (TV) display research. Numerous technologies have been developed but none has been commercially significant in the TV field except for small portable receivers where CRT displays are impractical. The entry for flat panels into the TV market may be HDTV, where large high-resolution displays are generally required. CRTs for this market are going to be expensive devices in the home and presents an opportunity for flat panels to get into the market provided such displays can achieve desired screen sizes at reasonable costs. It would also be desirable to have a flat panel display that is easier to build as it gets larger instead of being more difficult to build as it gets larger.

What is needed is a flat display that is easier to build as it gets larger instead of being more difficult to build as it gets larger. We also want to eliminate the need to front up rear projection.

SUMMARY

In accordance with an embodiment of the invention, an apparatus is disclosed. The apparatus includes a plurality of pixels arranged in a matrix of a plurality of columns coupled together, configured to activate a row of pixels from top to bottom. The apparatus also includes a synchronizer, located between two consecutive rows of ferro-electric liquid crystal displays (FLCD) lenses and coupled between the columns to allow all pixels of a single row to be illuminated at the same time.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

In one aspect, the invention relates to an apparatus comprising a plurality of pixels arranged in a matrix of rows and columns and a synchronizer configured to activate the pixels by row location. According to further details and specific embodiments described below, the invention finds use in flat panel displays, particularly large flat panel displays. In this context, the invention offers an improvement over prior art projection systems, since the device is a direct view display.

Figure 1:
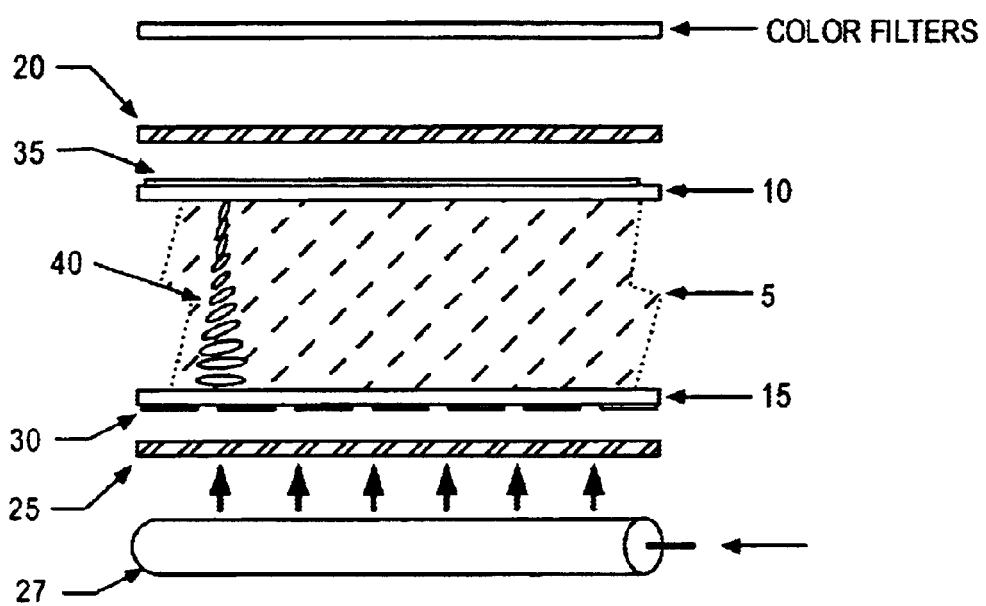
FIG. 1 is a cross-section of a twisted nematic LCD panel in transmission mode.
Figure 2:
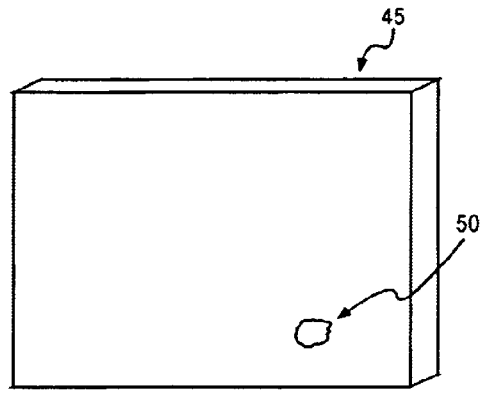
FIG. 2 is a schematic view of a prior art flat panel illustrating one defective element.
Figure 3:
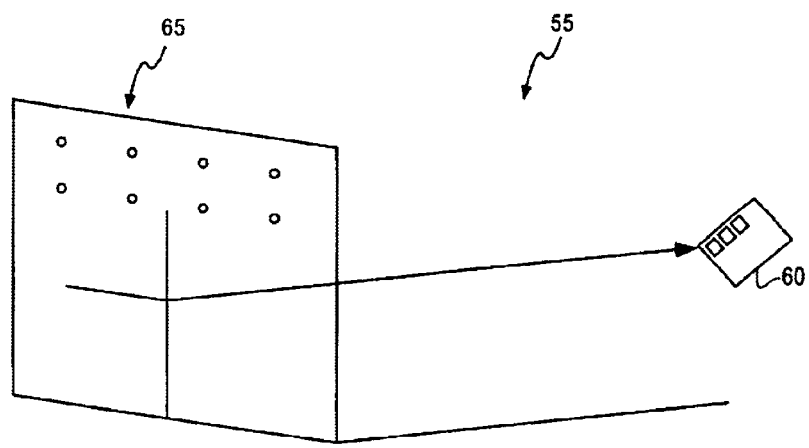
FIG. 3 is a schematic view of a prior art micro-mirror projector.
Figure 4:
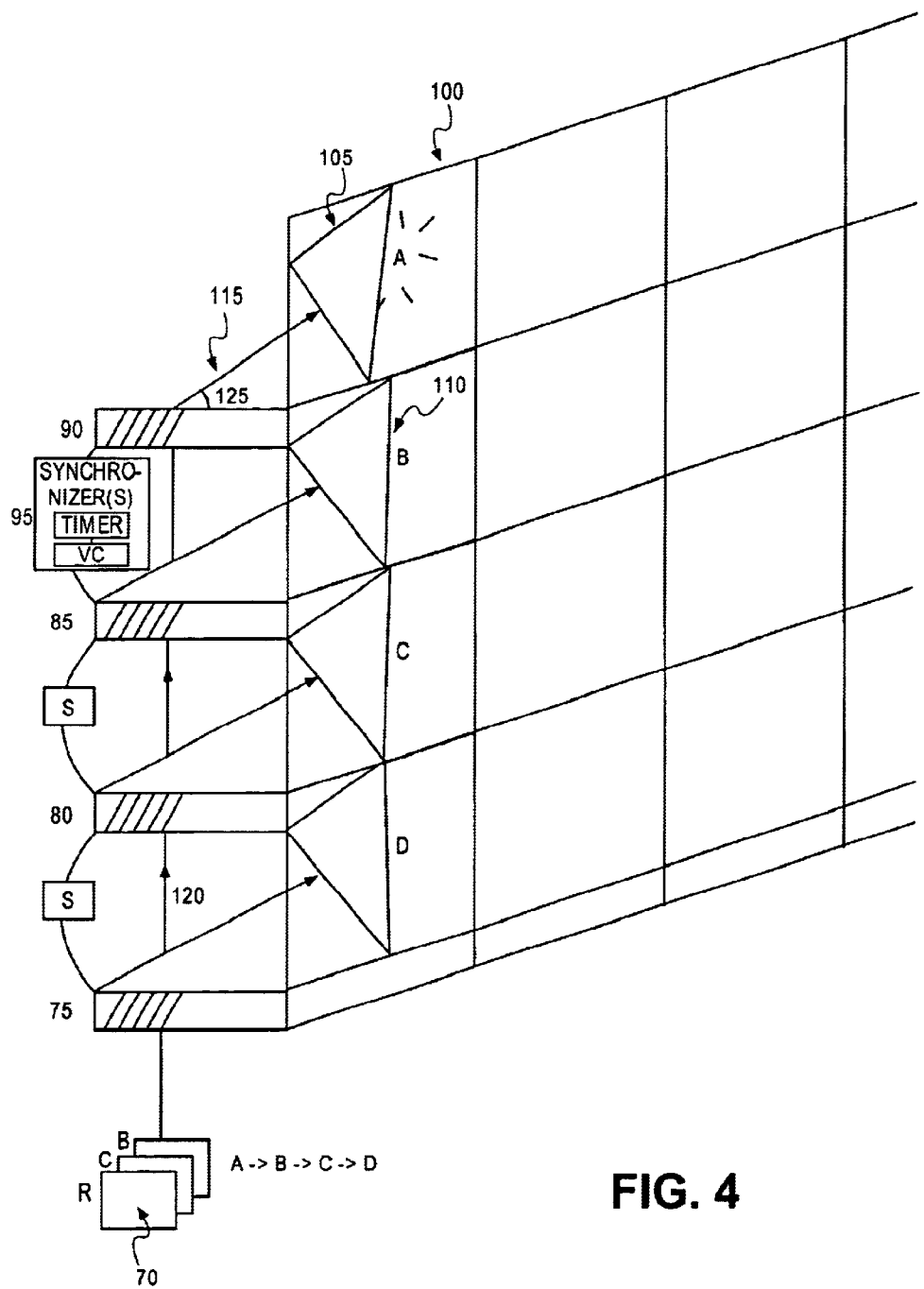
FIG. 4 is a schematic front side perspective view of a plurality of columns of pixels, wherein a light source passes light to the lens above it, which subsequently gets refracted onto a combiner prism, in accordance with an embodiment of the invention.

In one embodiment, the basic system design of a display of the invention includes a set of vertical columns where each column 100 utilizes ferro-electric liquid crystal display (FLCD) lenses to display a set of vertical pixels, as shown in FIG. 4. FLCD lenses work as follows. In a smectic A phase, the FLCD appears transparent to a beam from a laser. Smectic C phase is used to steer the beam onto a combiner prism. The refractive index of the crystals is utilized to enable this steering. FLCD lenses are known in the art as described.

FLCD lenses are typically used as computer work station displays. However, such utilize FLCDs in essentially the same manner as LCDs in that the FLCDs are arrayed as a matrix with each effectively having its own light source. If one FLCD fails it is not possible to replace it without replacing the entire display.

FIG. 4 is a schematic front side perspective view of a plurality of columns of pixels, wherein a light source passes light to the FLCD lens above it, which subsequently gets refracted onto a combiner prism, in accordance with an embodiment of the invention. A light source transmits light to the FLCD lens above it which then refracts the light onto combiner prism 105. The top of each combiner prism is coated with a reflective material. Plurality of columns 100 are coupled together and configured to display a single row of pixels scanned out from top to bottom. Each column 100 displays a single pixel at a time beginning with the topmost pixel. The scan timing for all columns is synchronized such that across the display an entire row is scanned vertically. Synchronizers 77, 83, 85, and 95 of timing control unit (TCU) 97, located between two consecutive FLCD lenses is provided to allow all pixels of a single row to be lit at the same time. A selected column acts as the master and controls all the pixels within a given row.

Each column 100 is a stack of FLCD cells. Light source 70, at the base of each column, shines light through FLCD lenses 75, 80 and 85 whose crystals are vertically aligned. The transmitted light is not diverted or refracted by these lenses. Upon reaching the FLCD lens 90, the angled crystals in the FLCD reflect the light onto the combiner prism 105. A suitable light source includes a laser light source. If a laser light is used as the light source, because of its generally coherent light, concerns of light spreading are minimized. Then FLCD lens 90 tilts or refracts this light onto combiner prism 105. Synchronizer 95 determines how fast to scroll down to the next row and tilt onto the next combiner prism 110. In one embodiment, synchronizer 95 may include a digital timer connected to a voltage controller. When the next pixel is to be displayed, the voltage values for each FLCD cell is applied to the cell connected to it and the diodes are set to display the color for the next pixel. An angled collimator assists in combining and directing the red, green, and blue light for a pixel. Angle 125 of tilt 115 is controlled by the voltage applied to the FLCD lens, the refractive index of the FLCD lens and the combiner prism. Timing control unit (TCU) 150 coordinates all of the row synchronizers and the intensity of the light source for each column.

Gap 120 between two adjacent FLCD lenses is used to account for the refractive index. Gap 120 may be void or be filled with a material, such as a transparent plastic material. If angle of refraction 125 is too steep then the FLCD lens will not be able to focus. It is important to remain within the index of refraction in order to get a reflection. If angle 125 goes beyond the range of refractive index, the light will go through the crystal instead of reflecting off of it and the ability to reflect the light to the combiner prism will be lost. Thus, the refractive index of FLCD material 90 will indicate angle 125 for the light to be bent. A greater refractive index will allow steering of the light even further. Instead of building flat lenses, such lenses may have to be built tilted so that each one can pass the light to the FLCD lens above it and shift the light onto the combiner prism. By using a prism, the requirement of how much refractive index is needed from the material will be decreased because the prism will catch the light and bend it the rest of the way, onto the display. In other words, the prism finishes the job of steering the light and minimizes the amount of tilt that is required.

Figure 5:
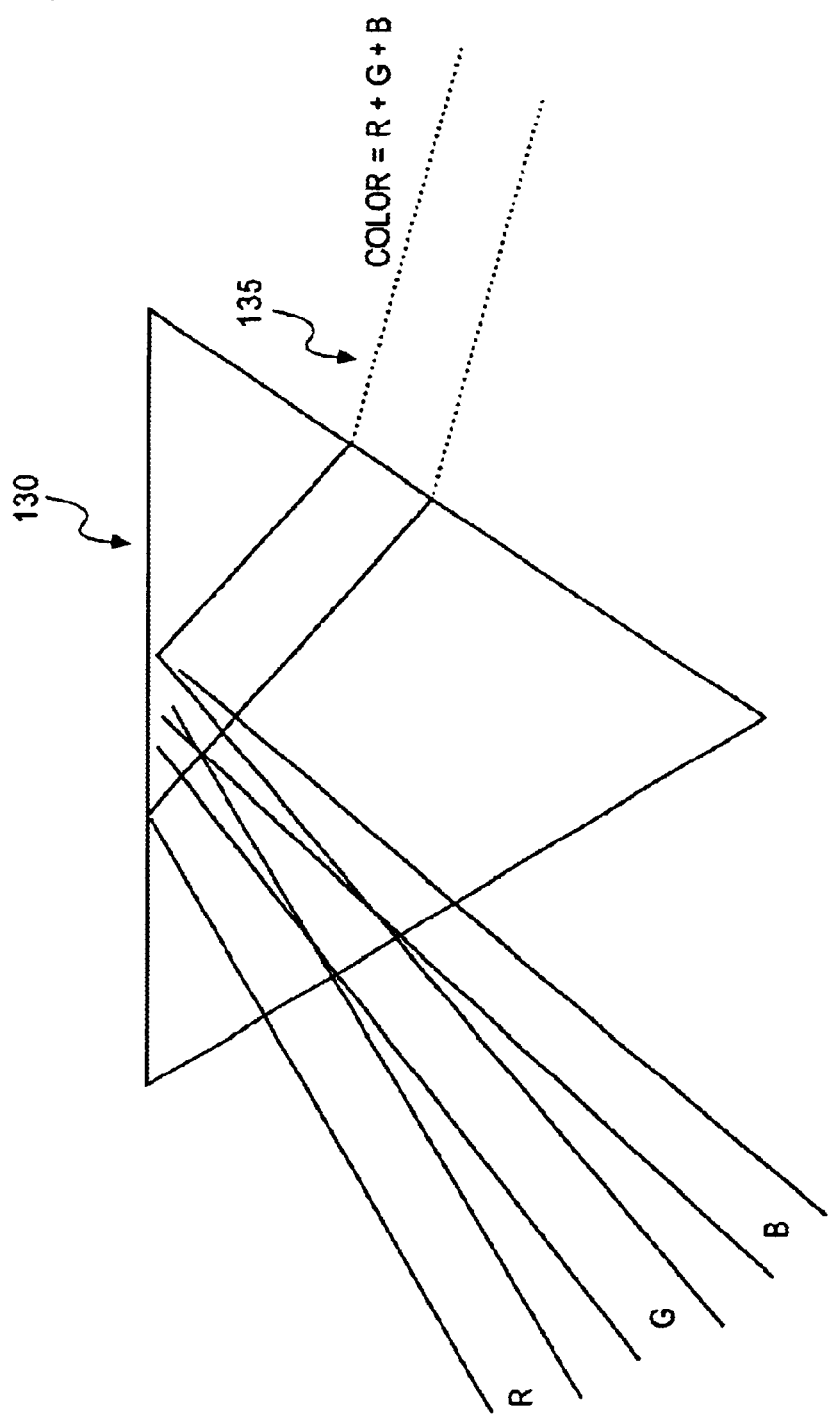
FIG. 5 is a schematic planar view of a combiner prism illustrating three color phosphors (Red, Green, and Blue) being input into the prism, where a combined color is emitted out, in accordance with an embodiment of the invention.

FIG. 5 is a schematic diagram of combiner prism 130 illustrating three color phosphors (Red, Green, and Blue) being input into the prism, where a single light 135 is emitted out, in accordance with one embodiment of the invention. Depending on the intensity of the color phosphors, prism 130 will emit light colored according to the combined red, green and blue intensities 135. If no light is input, no light will be emitted. If all three lights are input at full intensity, then the prism will shine a white light. If all three colors are dimmed, then a gray light will be emitted. If only red and green lights are active, then a yellow color will appear. A monochrome device can be constructed by using only a single light at the bottom of each column.

Figure 6:
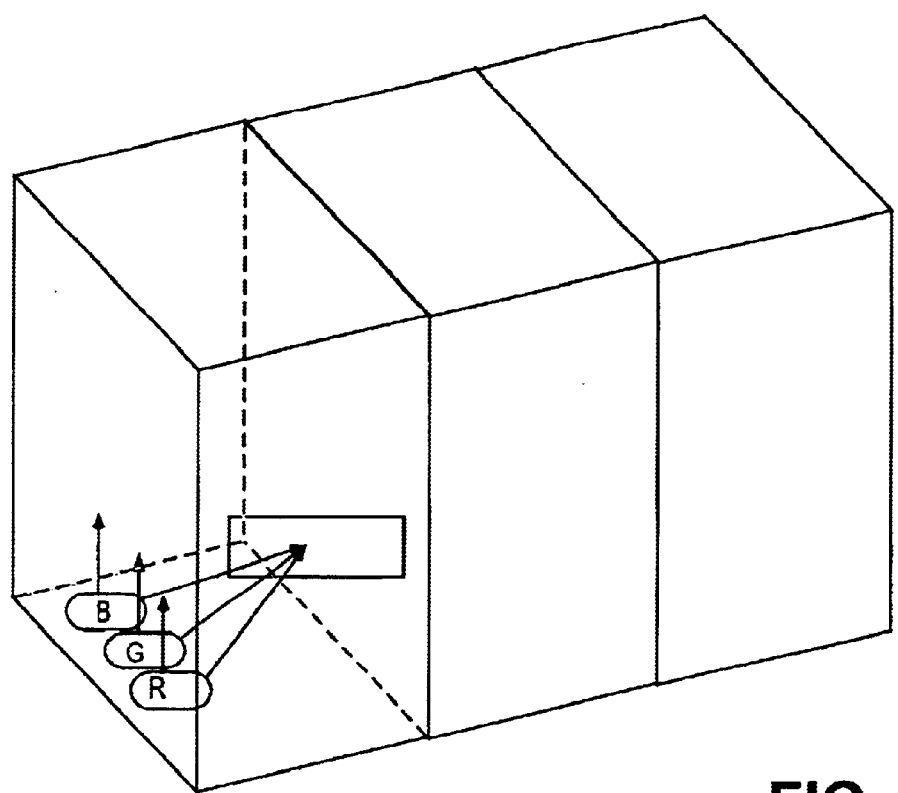
FIG. 6 is a schematic perspective top view of a plurality of columns of a display of pixels, wherein the red, green, and blue lights from a light source are placed front to back, at the base of the column, in accordance with an embodiment of the invention.
Figure 7:
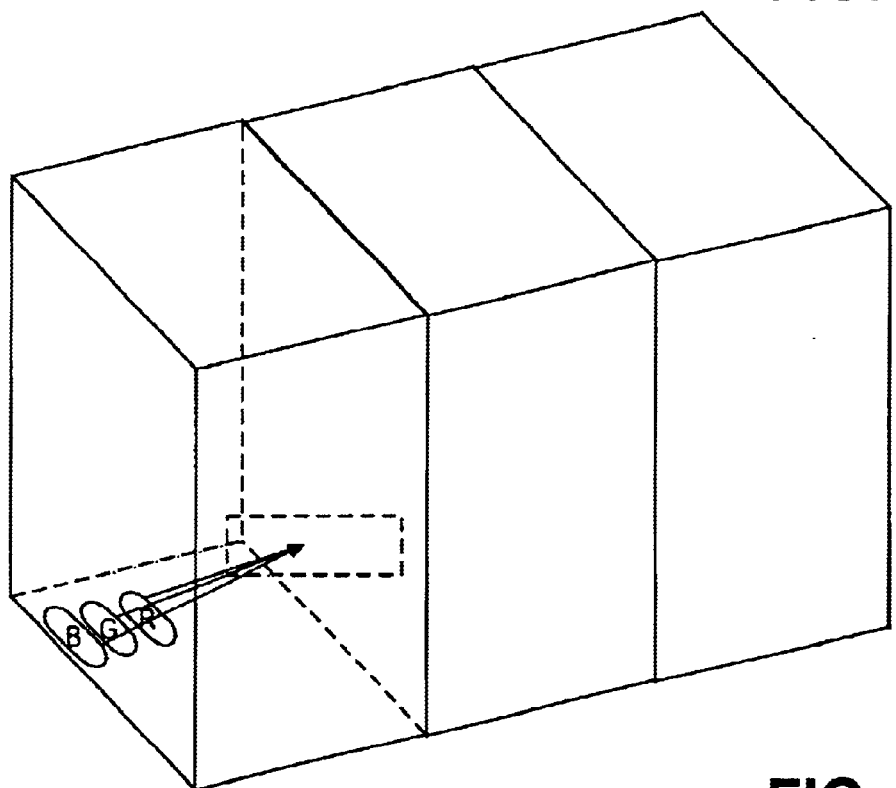
FIG. 7 is a schematic perspective top view of a plurality of columns of a display of pixels, wherein the red, green, and blue lights from the light source are placed side by side, at the base of the column, in accordance with an embodiment of the invention.

FIG. 6 is a schematic diagram of the invention illustrating a plurality of columns, wherein the red, green, and blue lights from the light source are placed front to back, at the base of the column, in accordance with one embodiment of the invention. If the refractive index is great enough then it is possible to stack the red, green, and blue color phosphors front to back because the index is high enough for the one in back to refract the light to the front. In a more inexpensive material, if the index is not high enough, it will be necessary to place the colors side by side, as shown in FIG. 7, so that each one has a similar minimum amount of bend to direct the light onto the display. For both FIG. 6 and FIG. 7, the rear walls, 601 and 701, are matte black to enhance the display contrast.

Although, in the embodiment described, each column is coupled together, each column is independent so each element in each column can be manufactured individually. One advantage to individual manufacture is that, in the case of, for example, a single defective element, the single element will not destroy the entire display, as in the prior art, and can be replaced with another single element. Therefore, the manufacturing yield of the flat panel display of the invention will be higher. Also, because each column is independent from one another, each column is moldable to take on various forms, such as a large cylindrical display for an advertising promotion. Other applications include teleconferencing where the invention could create the effect of two offices separated by a glass wall, advertising such as animated billboard and virtual store displays, and in the entertainment industry, one could imagine a large wrap around screen in the home for better immersion in entertainment content.

In another embodiment, the prisms can be molded from the actual manufacturing material instead of gluing or bonding the prisms after the columns are built. In addition, the facing for each pixel in a column may have a semi-transparent frosted treatment to eliminate or decrease the speckling produced by the coherent light source.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

We claim:

1. An apparatus comprising:
   a plurality of pixels arranged as a plurality of columns;
   a light source located at a bottom or top of each column, the light source shining a predetermined combination of red, green, and blue light onto a ferro-electric liquid crystal display (FLCD) lens from above or below;
   wherein each of said columns includes:
      a plurality of ferroelectric liquid crystal display (FLCD) lenses arranged such that each FLCD lens shifts received light onto a combiner prism or onto a neighboring FLCD lens until the light reaches a top or bottom pixel in the column, a FLCD lens of a top row of the column tilts over red, green, and blue lights onto the combiner prism, and
      a synchronizer coupled to the pixels of each of the plurality of columns and configured to activate the plurality of pixels by row location.

2. The apparatus of claim 1, wherein the plurality of pixels are activated from top to bottom.

3. The apparatus of claim 1, wherein the plurality of pixels are activated from bottom to top.

4. The apparatus of claim 1, wherein a set of synchronizers is configured to activate consecutive rows of the plurality of pixels.

5. The apparatus of claim 1, wherein an angle of the tilt is controlled by changing current intensity applied to each FLCD lens by the synchronizer.

6. The apparatus of claim 1, wherein an angle of the tilt is controlled by a refractive index of the FLCD lens and the combiner prism.

7. The apparatus of claim 1 wherein each of the plurality of columns comprises: a frosted glass-like treatment to eliminate or decrease the number of speckles obtained from the light source.

8. An apparatus comprising:
   a plurality of pixels arranged as a plurality of columns;
   a light source located at a bottom or top of each column, the light source shining a predetermined combination of red, green, and blue light onto a ferro-electric liquid crystal display (FLCD) lens from above or below;
   wherein each of said columns includes:
      a plurality of ferro-electric liquid crystal display (FLCD) lenses arranged such that each FLCD lens shifts received light ante a combiner prism or onto a neighboring FLCD lens until the light reaches a top or bottom pixel in the column, and
      a synchronizer coupled to the pixels of each of the plurality of columns and configured to activate the plurality of pixels by row location, the synchronizer determines how fast to activate the next row and tilt it onto the next set of combiner prisms.

9. The apparatus of claim 8, wherein a gap is formed between two FLCD lenses to account for the refractive index.

10. The apparatus of claim 9, wherein the gap comprises one of air or plastic.

11. An apparatus comprising:
   a plurality of pixels arranged as a plurality of columns;
   a light source located at a bottom or top of each column, the light source shining a predetermined combination of red, green, and blue light onto a ferro-electric liquid crystal display (FLCD) lens above or below it;
   wherein each of said columns includes:
      a plurality of ferro-electric liquid crystal display (FLCD) lenses arranged such that each FLCD lens shifts received light onto a combiner prism or onto the FLCD lens above or below it, until the light reaches a top or bottom pixel in the column, and
      a synchronizer coupled to the pixels of each of the plurality of columns and configured to activate the plurality of pixels by row location, the synchronizer comprises a digital timer connected to a voltage controller.

12. An apparatus comprising:
   a plurality of pixels arranged as a plurality of columns;
   a light source shining a predetermined combination of red, green, and blue light onto a ferro-electric liquid crystal display (FLCD) lens above or below it, the red, green, and blue light sources are placed front to back or side to side, at the top or bottom of each column, depending on an amount of refractive index available,
   wherein each of said columns includes:
      a plurality of FLCD lenses arranged such that each FLCD lens shifts received light onto a combiner prism or onto the FLCD lens above or below it until the light reaches a top or bottom pixel in the column; and
      a synchronizer coupled to the pixels of each of the plurality of columns and configured to activate the plurality of pixels by row location.

13. A method comprising:
   arranging a plurality of ferroelectric liquid crystal display (FLCD) lenses as a plurality of columns such that each FLCD lens in a column shifts received light onto a combiner prism or onto the FLCD lens above or below it, until the light reaches a top or bottom pixel in the column;
   shining a predetermined combination of red, green, and blue light onto a FLCD lens at a top or bottom of each column;
   synchronizing each of the plurality of columns and activating the plurality of pixels by row location; and
   activating each row of pixels during said synchronizing, a voltage controller connected to an FLCD lens causes the FLCD lens to tilt the light coming from below or above it onto a combiner prism.

14. The method of claim 13 comprising:
   activating the plurality of pixels from one of top to bottom and bottom to top.

15. The method of claim 13, comprising:
   eliminating or decreasing a number of speckles obtained from a light source by use of a frosted front facing and using a black matte back wall to show a black pixel when no light is emitted.

16. A method comprising:
   arranging a plurality of ferroelectric liquid crystal display (FLCD) lenses as a plurality of columns such that each FLCD lens in a column shifts received light onto a combiner prism or onto the FLCD lens above or below it, until the light reaches a top or bottom pixel in the column;

shining a predetermined combination of red, green, and blue light onto a FLCD lens at a top or bottom of each column; tilting over red, green, and blue lights onto a combiner prism; and synchronizing each of the plurality of columns and activating the plurality of pixels by row location.

17. The method of claim 16, wherein said tilting is at a predetermined angle due to a changing voltage value to an FLCD lens.

18. A method comprising:

arranging a plurality of ferroelectric liquid crystal display (FLCD) lenses as a plurality of columns such that each FLCD lens in a column shifts received light onto a combiner prism or onto the FLCD lens above or below it, until the light reaches a top or bottom pixel in the column;

shining a predetermined combination of red, green, and blue light onto a FLCD lens at a top or bottom of each column;

synchronizing each of the plurality of columns and activating the plurality of pixels by row location; and arranging the red light, the green light, and the blue light from front to back or side by side, at the bottom or top of each column, depending on an amount of refractive index available.

19. The method of claim 18, comprising:

providing a gap between two FLCD lenses to account for the refractive index.

20. The method of claim 19, wherein the gap is formed from one of air and plastic.

* * * * *